United States Patent
Kitamura et al.

(10) Patent No.: US 8,039,418 B2
(45) Date of Patent: Oct. 18, 2011

(54) EXHAUST GAS-PURIFYING CATALYST

(75) Inventors: Ichiro Kitamura, Kakegawa (JP); Akimasa Hirai, Kakegawa (JP); Kenichi Taki, Kakegawa (JP)

(73) Assignee: Cataler Corporation, Kakegawa-shi, Shizuoka (JP)

( * ) Notice: Subject to any disclaimer, the term of this patent is extended or adjusted under 35 U.S.C. 154(b) by 0 days.

(21) Appl. No.: 12/635,943

(22) Filed: Dec. 11, 2009

(65) Prior Publication Data

US 2010/0087314 A1 Apr. 8, 2010

Related U.S. Application Data

(63) Continuation of application No. PCT/JP2008/062220, filed on Jul. 4, 2008.

(30) Foreign Application Priority Data

Jul. 4, 2007 (JP) ................................ 2007-176602

(51) Int. Cl.
- *B01J 23/56* (2006.01)
- *B01J 23/63* (2006.01)
- *B01J 23/58* (2006.01)
- *B01D 53/94* (2006.01)

(52) U.S. Cl. ........ 502/325; 502/304; 502/328; 502/339; 502/340; 502/527.12; 423/213.5

(58) Field of Classification Search ............ 502/527.12, 502/325, 328, 304, 339, 340; 423/213.5
See application file for complete search history.

(56) References Cited

U.S. PATENT DOCUMENTS

| 5,376,610 A | 12/1994 | Takahata et al. |
| 5,753,580 A | 5/1998 | Hayashi et al. |
| 6,294,140 B1 * | 9/2001 | Mussmann et al. ........ 423/213.5 |
| 6,348,430 B1 * | 2/2002 | Lindner et al. ................ 502/304 |
| 6,764,665 B2 * | 7/2004 | Deeba et al. ................ 423/239.1 |
| 2008/0044330 A1 * | 2/2008 | Chen et al. ................ 423/213.5 |

FOREIGN PATENT DOCUMENTS

| JP | 1281144 | | 11/1989 |
| JP | 5293376 | | 11/1993 |
| JP | 06-063403 | * | 3/1994 |
| JP | 663403 | | 3/1994 |
| JP | 0760117 | | 3/1995 |
| JP | 9155192 | | 6/1997 |
| JP | 9221304 | | 8/1997 |
| JP | 2005-000884 | | 1/2005 |
| WO | WO-2009/005153 | | 1/2009 |

OTHER PUBLICATIONS

International Preliminary Report on Patentability mailed Feb. 4, 2010, for PCT Appliction No. PCT/JP2008/062220, English Translation, nine pages.
International Search Report for PCT/2008/062220, mailed Sep. 18, 2008.

* cited by examiner

*Primary Examiner* — Stanley Silverman
*Assistant Examiner* — Diana J Liao
(74) *Attorney, Agent, or Firm* — Morrison & Foerster LLP

(57) ABSTRACT

A high exhaust gas-purifying performance is achieved. An exhaust gas-purifying catalyst includes a substrate, a lower layer covering the substrate and including an oxygen storage material and palladium, and an upper layer covering the lower layer and including rhodium and a carrier supporting it. The lower layer is rhodium-free. The upper layer has an oxygen storage capacity lower than that of the lower layer.

8 Claims, 1 Drawing Sheet

EXHAUST GAS-PURIFYING CATALYST

CROSS REFERENCE TO RELATED APPLICATIONS

This is a Continuation Application of PCT Application No. PCT/JP2008/062220, filed Jul. 4, 2008, which was published under PCT Article 21(2) in Japanese.

This application is based upon and claims the benefit of priority from prior Japanese Patent Application No. 2007-176602, filed Jul. 4, 2007, the entire contents of which are incorporated herein by reference.

BACKGROUND OF THE INVENTION

1. Field of the Invention

The present invention relates to an exhaust gas-purifying catalyst including oxygen storage material.

2. Description of the Related Art

Until today, as an exhaust gas-purifying catalyst that treats exhaust gas of an automobile, etc., a three-way catalyst with precious metal supported by a refractory carrier made of an inorganic oxide such as alumina is widely used. In the three-way catalyst, the precious metal plays the role in promoting the reduction of nitrogen oxides ($NO_x$) and the oxidations of carbon monoxide (CO) and hydrocarbons (HC). Further, the refractory carrier plays the roles in increasing the specific surface area of the precious metal and suppressing the sintering of the precious metal by dissipating heat generated by the reactions.

Jpn. Pat. Appln. KOKAI Publication No. 1-281144, Jpn. Pat. Appln. KOKAI Publication No. 9-155192 and Jpn. Pat. Appln. KOKAI Publication No. 9-221304 describe exhaust gas-purifying catalysts using cerium oxide or an oxide containing cerium and another metal element. These oxides are oxygen storage materials having oxygen storage capacity. When an oxygen storage material is used in a three-way catalyst, the above-described reduction and oxidations can be optimized. Even for a three-way catalyst using an oxygen storage material, however, it is difficult to achieve an excellent performance in both the state just after starting an engine and the state the engine is driven continuously as will be described below.

In the state just after starting an engine, the temperature of the catalyst is low. The ability of a precious metal to purify an exhaust gas in low temperature conditions is lower than the ability of the precious metal to purifying the exhaust gas in high temperature conditions. Thus, considering the performance just after starting an engine, decreasing the heat capacity of the exhaust gas-purifying catalyst is advantageous.

On the other hand, in the state where the engine is driven continuously, the temperature of the catalyst is sufficiently high. In this case, since the ability of the precious metal to purify the exhaust gas is high, it is advantageous that the exhaust gas-purifying catalyst to contain much more amount of oxygen storage material in order to respond to fluctuations of the exhaust gas composition.

As above, the performance just after starting an engine and the performance in the state where the engine is driven continuously are in a trade-off relationship. For this reason, achieving an excellent performance in both the state just after starting an engine and the state where the engine is driven continuously is difficult, and therefore consistently achieving a high exhaust gas-purifying efficiency is difficult.

BRIEF SUMMARY OF THE INVENTION

An object of the present invention is to achieve a high exhaust gas-purifying performance.

According to an aspect of the present invention, there is provided an exhaust gas-purifying catalyst comprising a substrate, a lower layer covering the substrate and including an oxygen storage material and palladium, the lower layer being rhodium-free, and an upper layer covering the lower layer and including rhodium and a carrier supporting it, the upper layer being lower in oxygen storage capacity than the lower layer.

DETAILED DESCRIPTION OF THE INVENTION

Embodiments of the present invention will be described below.

Figure 1:
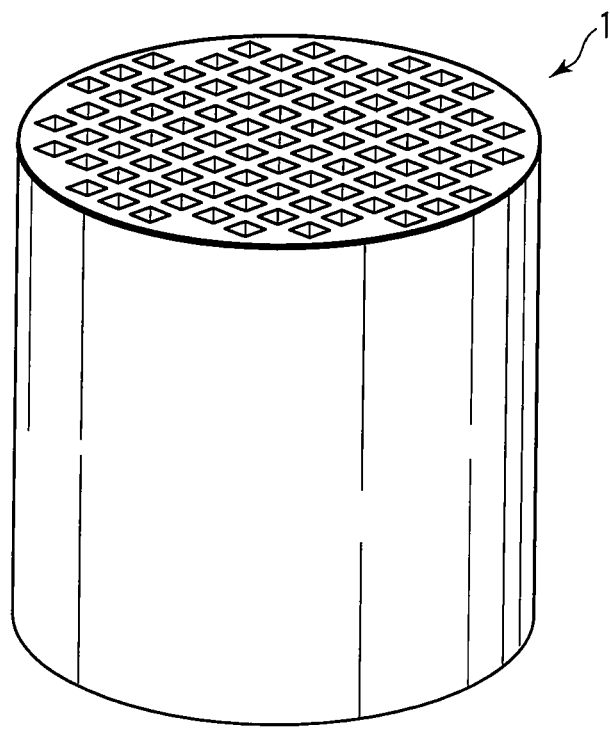
FIG. 1 is a perspective view schematically showing an exhaust gas-purifying catalyst according to an embodiment of the present invention.
Figure 2:
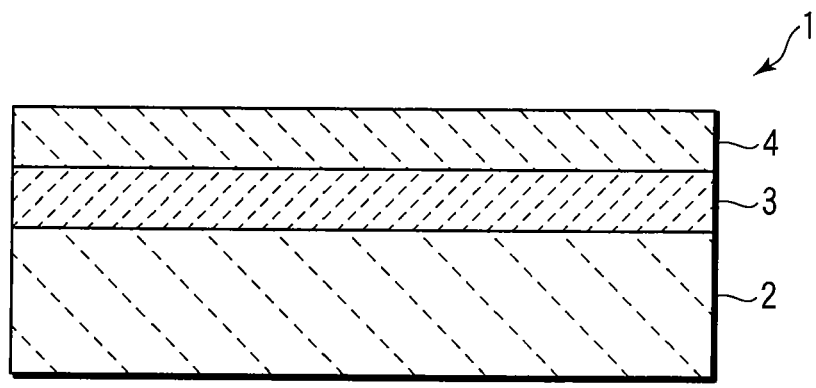
FIG. 2 is a sectional view schematically showing an example of a structure that can be employed in the exhaust gas-purifying catalyst shown in FIG. 1.

FIG. 1 is a perspective view schematically showing an exhaust gas-purifying catalyst according to an embodiment of the present invention. FIG. 2 is a sectional view schematically showing an example of a structure that can be employed in the exhaust gas-purifying catalyst shown in FIG. 1.

The exhaust gas-purifying catalyst 1 shown in FIGS. 1 and 2 is a monolith catalyst. The exhaust gas-purifying catalyst 1 includes a substrate 2 such as a monolith honeycomb substrate. Typically, the substrate 2 is made of ceramics such as cordierite.

On the wall of the substrate 2, a lower layer 3 is formed. The lower layer 3 includes a first refractory carrier, a first oxygen storage material and palladium. The lower layer 3 plays a prominent role in imparting an oxygen storage capacity to the exhaust gas-purifying catalyst 1 and also plays a prominent or auxiliary role in imparting an exhaust gas-purifying ability of palladium to the exhaust gas-purifying catalyst 1.

The lower layer 3 is rhodium-free. It should be noted that when "a layer L1 is element E-free" is mentioned in the present specification or claims, the case where unavoidable amount of element E is present in the layer L1 is not excluded. For example, the layer L1 may contain element E diffused into it from a layer L2 adjacent thereto.

The first refractory carrier has a heat stability superior to that of the first oxygen storage material. As the material of the first refractory carrier, alumina, zirconia or titania can be used, for example.

The first oxygen storage material is, for example, ceria, a composite oxide of ceria and other metal oxide, or a mixture thereof. As the composite oxide, a composite oxide of ceria and zirconia can be used, for example.

The first oxygen storage material may support precious metal such as platinum-group metals. In general, loading a trace amount of precious metal onto an oxygen storage material increases the oxygen storage capacity. As the first oxygen storage, a material prepared by loading platinum onto a composite oxide of ceria and zirconia can be used, for example.

The coating amount of the lower layer 3 per 1 L of volumetric capacity of the substrate 2 is set, for example, within a range of 20 to 200 g/L. In the case where the coating amount is small, achieving a sufficient oxygen storage capacity is difficult. In the case where the coating amount is large, the heat capacity of the exhaust gas-purifying catalyst 1 increases.

A mass ratio of the oxide used for the first oxygen storage material with respect to the first refractory carrier is set, for example, within a range of 10% to 90% by mass.

When a composite oxide of ceria and zirconia is used as the first oxygen storage material, an atomic ratio of cerium with respect to zirconium is set, for example, within a range of 3 to 97 atomic %.

On the lower layer 3, an upper layer 4 is formed. The upper layer 4 includes a second refractory carrier and rhodium. The upper layer 4 plays a prominent role in imparting an exhaust gas-purifying ability of rhodium to the exhaust gas-purifying catalyst 1.

The second refractory carrier has a heat stability superior to that of the first oxygen storage material. As the material of the second refractory carrier, the materials mentioned for the first refractory carrier can be used, for example.

The coating amount of the upper layer 4 per 1 L of volumetric capacity of the substrate 2 is set, for example, within a range of 10 to 200 g/L. In the case where the coating amount is small, it is possible that the upper layer 4 has an insufficient oxygen storage capacity. In the case where the coating amount is large, the heat capacity of the exhaust gas-purifying catalyst 1 increases.

The upper layer 4 may further include palladium and/or platinum. The upper layer 4 can further include a second oxygen storage material. As the second oxygen storage material, the materials mentioned for the first oxygen storage material can be used, for example.

In the case where the lower layer 3 is omitted from the exhaust gas-purifying catalyst 1, it is necessary that the upper layer 4 plays both the role in promoting the reduction of $NO_X$ and the oxidations of CO and HC and the role in storing oxygen. In this case, however, when the coating amount of the upper layer 4 is decreased in order to decrease the heat capacity of the exhaust gas-purifying catalyst and the density of the precious metal is increased in order to maximize the efficiencies of the reduction of $NO_X$ and the oxidations of CO and HC, the amount of the oxygen storage material is decreased and the oxygen storage capacity of the oxygen storage material is lowered.

By contrast, in the case where the lower layer 3 is interposed between the upper layer 4 and the substrate 2, it is possible, for example, to give the role in promoting the reduction of $NO_X$ and the oxidations of CO and HC mainly to the upper layer 4 or to both of the lower layer 3 and the upper layer 4. Further, it is possible to give the role in storing oxygen mainly to the lower layer 3. For these reasons, in the case where the coating amount of the lower layer 3 is decreased, achieving a sufficiently large oxygen storage capacity is possible. Thus, in the case where the coating amount of the upper layer 4 is decreased and the densities of palladium and rhodium are increased, for example, the oxygen storage capacity of the exhaust gas-purifying catalyst 1 will not become insufficient. In addition, since the lower layer 3 is interposed between the upper layer 4 and the substrate 2, the lower layer 3 does not hinder the exhaust gas from coming into contact with the upper layer 4.

In order to obtain an exhaust gas-purifying catalyst having an excellent exhaust gas-purifying ability at low cost, it is advantageous that the palladium content is greater than the rhodium content. However, in the case where palladium is contained only in the upper layer 4, it is necessary that the coating amount of this layer is made larger or the density of palladium is made higher. When the coating amount is made larger, the heat capacity of the exhaust gas-purifying catalyst increases. When the density of palladium is made excessively high, the oxygen storage capacity of this layer is lowered.

In this exhaust gas-purifying catalyst 1, it is possible that the upper layer 4 contains palladium in addition to that the lower layer 3 contains palladium. Thus, when palladium is contained in both the lower layer 3 and upper layer 4, the palladium content can be made greater without making the coating amount larger and without making the density of palladium excessively higher. Further, if the density of palladium is not excessively high, the oxygen storage capacity of the oxygen storage material increases by addition of palladium. That is, an excellent oxygen storage capacity, an exhaust gas-purifying ability and low cost can be achieved.

Therefore, when such a structure is employed, a high exhaust gas-purifying efficiency can be achieved in both the state just after starting an engine and the state where the engine is driven continuously in addition to achieving low cost.

Various modifications can be made to the exhaust gas-purifying catalyst 1.

For example, a part of the lower layer 3 on the side of the upper layer 4 may have palladium content greater than that of a part of the lower layer 3 on the side of the substrate 2. In this case, the part of the lower layer 3 on the side of the substrate 2 may have an oxygen storage capacity (or cerium content) higher than that of the part of the lower layer 3 on the side of the upper layer 4. In this case, the part of the lower layer 3 on the side of the substrate 2 may be palladium-free. Also, the part of the lower layer 3 on the side of the substrate 2 may further contain platinum.

A part of the upper layer 4 on the side of the lower layer 3 may have rhodium content greater than that of a part of the upper layer on the surface side. In this case, the part on the side of the lower layer 3 may have palladium content smaller than that of the part on the surface side.

The lower layer 3 and/or the upper layer 4 may further contain an oxide of alkaline-earth metal such as barium, an oxide of rare-earth element such as lanthanum, neodymium, praseodymium and yttrium, or a mixture thereof. These oxides may form composite oxides and/or solid solutions together with other oxides such as ceria.

The exhaust gas-purifying catalyst 1 may further includes a hydrocarbon-adsorbing layer interposed between the substrate 2 and the lower layer 3. The hydrocarbon-adsorbing layer is a layer including a hydrocarbon-adsorbing material such as zeolite. In the case where such a structure is employed, HC emission can be decreased as compared with the case where the structure shown in FIG. 2 is employed.

Alternatively, the lower layer 3 may further include the hydrocarbon-adsorbing material such as zeolite. Also in the case where such a structure is employed, HC emission can be decreased as compared with the case where the structure shown in FIG. 2 is employed. Further, in the case where the lower layer 3 further contains the hydrocarbon-adsorbing material, production of the exhaust gas-purifying catalyst 1 can be simplified as compared with the case where the hydrocarbon-adsorbing layer is interposed between the substrate 2 and the lower layer 3.

Examples of the present invention will be described below.

<Manufacture of Catalyst A>

In this example, the exhaust gas-purifying catalyst 1 shown in FIGS. 1 and 2 was manufactured by the following method. In this example, a two-layer structure of first and second layers was employed in the lower layer 3.

First, cerium-zirconium oxide powder having an atomic ratio of cerium to zirconium of 5:4 was prepared. Hereinafter, the cerium-zirconium oxide powder is referred to as oxide powder CZ1.

Then, 30 g of alumina powder, 30 g of the oxide powder CZ1, and aqueous palladium nitrate containing 0.5 g of palladium were mixed together to prepare slurry. Hereinafter, the slurry is referred to as slurry S1.

Subsequently, a monolith honeycomb substrate 2 made of cordierite was coated with the whole amount of the slurry S1. Here, used was a monolith honeycomb substrate having a length of 100 mm, a volumetric capacity of 1.0 L and 900 cells per square inch. The monolith honeycomb substrate 2 was dried at 250° C. for 1 hour and then fired at 500° C. for 1 hour. The first layer of the lower layer 3 was thus formed on the monolith honeycomb substrate 2.

Next, cerium-zirconium oxide powder having an atomic ratio of cerium to zirconium of 2:7 was prepared. Hereinafter, the cerium-zirconium oxide powder is referred to as oxide powder CZ2.

Then, 30 g of alumina powder, 30 g of the oxide powder CZ2, and aqueous palladium nitrate containing 1.0 g of palladium were mixed together to prepare slurry. Hereinafter, the slurry is referred to as slurry S2.

Subsequently, the above-described monolith honeycomb substrate 2 was coated with the whole amount of the slurry S2. The monolith honeycomb substrate 2 was dried at 250° C. for 1 hour and then fired at 500° C. for 1 hour. The second layer was thus formed on the first layer. The lower layer 3 having a two-layer structure of the first and second layers was thus obtained.

Thereafter, 30 g of alumina powder, 30 g of the oxide powder CZ2, and aqueous rhodium nitrate containing 0.5 g of rhodium were mixed together to prepare slurry. Hereinafter, the slurry is referred to as slurry S3.

Subsequently, the above-described monolith honeycomb substrate 2 was coated with the whole amount of the slurry S3. The monolith honeycomb substrate 2 was dried at 250° C. for 1 hour and then fired at 500° C. for 1 hour. An upper layer 4 was thus formed on the lower layer 3.

The exhaust gas-purifying catalyst 1 shown in FIGS. 1 and 2 was thus completed. Hereinafter, the exhaust gas-purifying catalyst 1 is referred to as catalyst A.

<Manufacture of Catalyst B>

In this example, the exhaust gas-purifying catalyst 1 shown in FIGS. 1 and 2 was manufactured by the following method. In this example, a two-layer structure of first and second layers was employed in the lower layer 3.

First, 30 g of alumina powder and 30 g of the oxide powder CZ1 were mixed together to prepare slurry. Hereinafter, the slurry is referred to as slurry S4.

Subsequently, the same monolith honeycomb substrate 2 as that used in the manufacture of the catalyst A was coated with the whole amount of the slurry S4. The monolith honeycomb substrate 2 was dried at 250° C. for 1 hour and then fired at 500° C. for 1 hour. The first layer of the lower layer 3 was thus formed on the monolith honeycomb substrate 2.

Next, 30 g of alumina powder, 30 g of the oxide powder CZ2, and aqueous palladium nitrate containing 1.5 g of palladium were mixed together to prepare slurry. Hereinafter, the slurry is referred to as slurry S5.

Subsequently, the above-described monolith honeycomb substrate 2 was coated with the whole amount of the slurry S5. The monolith honeycomb substrate 2 was dried at 250° C. for 1 hour and then fired at 500° C. for 1 hour. The second layer was thus formed on the first layer. The lower layer 3 having a two-layer structure of the first and second layers was thus obtained.

Thereafter, an upper layer 4 was formed on the lower layer 3 by the same method as that described for the catalyst A. The exhaust gas-purifying catalyst 1 shown in FIGS. 1 and 2 was thus completed. Hereinafter, the exhaust gas-purifying catalyst 1 is referred to as catalyst B.

<Manufacture of Catalyst C>

In this example, the exhaust gas-purifying catalyst 1 shown in FIGS. 1 and 2 was manufactured by the following method. In this example, a two-layer structure of first and second layers was employed in the lower layer 3.

First, 30 g of alumina powder, 30 g of the oxide powder CZ2, and aqueous palladium nitrate containing 0.5 g of palladium were mixed together to prepare slurry. Hereinafter, the slurry is referred to as slurry S6.

Subsequently, the same monolith honeycomb substrate 2 as that used in the manufacture of the catalyst A was coated with the whole amount of the slurry S6. The monolith honeycomb substrate 2 was dried at 250° C. for 1 hour and then fired at 500° C. for 1 hour. The first layer of the lower layer 3 was thus formed on the monolith honeycomb substrate 2.

Thereafter, the second layer of the lower layer 3 and an upper layer 4 was formed in this order by the same method as that described for the catalyst A.

The exhaust gas-purifying catalyst 1 shown in FIGS. 1 and 2 was thus completed. Hereinafter, the exhaust gas-purifying catalyst 1 is referred to as catalyst C.

<Manufacture of Catalyst D>

In this example, the exhaust gas-purifying catalyst 1 shown in FIGS. 1 and 2 was manufactured by the following method.

First, a lower layer 3 was formed on a monolith honeycomb substrate 2 by the same method as described for the catalyst A.

Next, 60 g of alumina powder, 60 g of the oxide powder CZ2, aqueous palladium nitrate containing 1.0 g of palladium, and aqueous rhodium nitrate containing 0.5 g of rhodium were mixed together to prepare slurry. Hereinafter, the slurry is referred to as slurry S7.

Subsequently, the above-described monolith honeycomb substrate 2 was coated with the whole amount of the slurry S7. The monolith honeycomb substrate 2 was dried at 250° C. for 1 hour and then fired at 500° C. for 1 hour. An upper layer 4 was thus formed on the lower layer 3.

The exhaust gas-purifying catalyst 1 shown in FIGS. 1 and 2 was thus completed. Hereinafter, the exhaust gas-purifying catalyst 1 is referred to as catalyst D.

<Manufacture of Catalyst E>

In this example, the exhaust gas-purifying catalyst 1 shown in FIGS. 1 and 2 was manufactured by the following method. In this example, a two-layer structure of third and fourth layers was employed in the upper layer 4.

First, a lower layer 3 was formed on the monolith honeycomb substrate 2 by the same method as described for the catalyst A. In this example, the first layer serves as the lower layer 3.

Next, using the slurry S3, the third layer of the upper layer 4 was formed on the lower layer 3 by the same method as described for the upper layer 4 of the catalyst A. Further, using the slurry S2, the fourth layer was formed on the third layer by the same method as described for the second layer of the catalyst A. The upper layer 4 having a two-layer structure of the third and fourth layers was thus obtained.

The exhaust gas-purifying catalyst 1 shown in FIGS. 1 and 2 was thus completed. Hereinafter, the exhaust gas-purifying catalyst 1 is referred to as catalyst E.

<Manufacture of Catalyst F>

In this example, the exhaust gas-purifying catalyst 1 shown in FIGS. 1 and 2 was manufactured by the following method. In this example, a two-layer structure of first and second layers was employed in the lower layer 3.

First, 30 g of alumina powder, 30 g of the oxide powder CZ1, and aqueous platinum nitrate containing 0.5 g of platinum were mixed together to prepare slurry. Hereinafter, the slurry is referred to as slurry S8.

The exhaust gas-purifying catalyst 1 shown in FIGS. 1 and 2 was completed using the same method as that described for the catalyst A except that the slurry S8 was used for forming the first layer of the lower layer 3 instead of the slurry S1. Hereinafter, the exhaust gas-purifying catalyst 1 is referred to as catalyst F.

<Manufacture of Catalyst G>

In this example, the exhaust gas-purifying catalyst 1 shown in FIGS. 1 and 2 was manufactured by the following method.

First, 60 g of alumina powder, 30 g of the oxide powder CZ1, and aqueous palladium nitrate containing 1.5 g of palladium were mixed together to prepare slurry. Hereinafter, the slurry is referred to as slurry S9.

Subsequently, the same monolith honeycomb substrate 2 as that used in the manufacture of the catalyst A was coated with the whole amount of the slurry S9. The monolith honeycomb substrate 2 was dried at 250° C. for 1 hour and then fired at 500° C. for 1 hour. The lower layer 3 was thus formed on the monolith honeycomb substrate 2.

Thereafter, an upper layer 4 was formed by the same method as that described for the catalyst A.

The exhaust gas-purifying catalyst 1 shown in FIGS. 1 and 2 was thus completed. Hereinafter, the exhaust gas-purifying catalyst 1 is referred to as catalyst G.

<Manufacture of Catalyst H>

In this example, the exhaust gas-purifying catalyst 1 shown in FIGS. 1 and 2 was manufactured by the following method.

First, 30 g of oxide powder and aqueous palladium nitrate containing 0.5 g of palladium were mixed together. The mixture was dried at 250° C. for 8 hours and subsequently fired at 500° C. for 1 hour. Hereinafter, the powder thus obtained is referred to as powder P1.

Next, 60 g of alumina powder, 30.5 g of the powder P1, 30 g of oxide powder CZ2, and aqueous palladium nitrate containing 1.0 g of palladium were mixed together to prepare slurry. Hereinafter, the slurry is referred to as slurry S10.

Subsequently, the same monolith honeycomb substrate 2 as that used in the manufacture of the catalyst A was coated with the whole amount of the slurry S9. The monolith honeycomb substrate 2 was dried at 250° C. for 1 hour and then fired at 500° C. for 1 hour. A lower layer 3 was thus formed on the monolith honeycomb substrate 2.

Thereafter, an upper layer 4 was formed by the same method as that described for the catalyst A.

The exhaust gas-purifying catalyst 1 shown in FIGS. 1 and 2 was thus completed. Hereinafter, the exhaust gas-purifying catalyst 1 is referred to as catalyst H.

<Manufacture of Catalyst I>

In this example, the exhaust gas-purifying catalyst 1 shown in FIGS. 1 and 2 was manufactured by the following method. In this example, a two-layer structure of first and second layers was employed in the lower layer 3.

First, 30 g of alumina powder, 30 g of the oxide powder CZ1, 6 g of barium sulfate, 3 g of lanthanum carbonate, and aqueous palladium nitrate containing 0.5 g of palladium were mixed together to prepare slurry. Hereinafter, the slurry is referred to as slurry S11.

Subsequently, the same monolith honeycomb substrate 2 as that used in the manufacture of the catalyst A was coated with the whole amount of the slurry S11. The monolith honeycomb substrate 2 was dried at 250° C. for 1 hour and then fired at 500° C. for 1 hour. The first layer of the lower layer 3 was thus formed on the monolith honeycomb substrate 2.

Next, 30 g of alumina powder, 30 g of the oxide powder CZ2, 6 g of barium sulfate, 3 g of lanthanum carbonate, and aqueous palladium nitrate containing 1.0 g of palladium were mixed together to prepare slurry. Hereinafter, the slurry is referred to as slurry S12.

Subsequently, the above-described monolith honeycomb substrate 2 was coated with the whole amount of the slurry S12. The monolith honeycomb substrate 2 was dried at 250° C. for 1 hour and then fired at 500° C. for 1 hour. The second layer was thus formed on the first layer. The lower layer 3 having a two-layer structure of the first and second layers was thus obtained.

Thereafter, 30 g of alumina powder, 30 g of the oxide powder CZ2, 6 g of barium sulfate, 3 g of lanthanum carbonate, and aqueous rhodium nitrate containing 0.5 g of rhodium were mixed together to prepare slurry. Hereinafter, the slurry is referred to as slurry S13.

Subsequently, the above-described monolith honeycomb substrate 2 was coated with the whole amount of the slurry S13. The monolith honeycomb substrate 2 was dried at 250° C. for 1 hour and then fired at 500° C. for 1 hour. An upper layer 4 was thus formed on the lower layer 3.

The exhaust gas-purifying catalyst 1 shown in FIGS. 1 and 2 was thus completed. Hereinafter, the exhaust gas-purifying catalyst 1 is referred to as catalyst I.

<Manufacture of Catalyst J>

In this example, an exhaust gas-purifying catalyst was manufactured by the following method.

First, 30 g of alumina powder, 30 g of the oxide powder CZ2, and aqueous palladium nitrate containing 1.5 g of palladium were mixed together to prepare slurry. Hereinafter, the slurry is referred to as slurry S14.

Subsequently, the same monolith honeycomb substrate as that used in the manufacture of the catalyst A was coated with the whole amount of the slurry S14. The monolith honeycomb substrate was dried at 250° C. for 1 hour and then fired at 500° C. for 1 hour. A lower layer was thus formed on the monolith honeycomb substrate.

Next, the above-described monolith honeycomb substrate was coated with the whole amount of the slurry S3. The monolith honeycomb substrate 2 was dried at 250° C. for 1 hour and then fired at 500° C. for 1 hour. An upper layer was thus formed on the lower layer.

An exhaust gas-purifying catalyst was thus completed. Hereinafter, the exhaust gas-purifying catalyst is referred to as catalyst J.

<Tests>

Each of the catalysts A to J was mounted on an automobile having an engine with a piston displacement of 0.7 L. Then, each automobile was driven to cover an endurance travel distance of 60,000 km. Thereafter, emission per 1 km of travel distance was determined using 10 and 15-mode method and 11-mode method for each of nonmethane hydrocarbons (NMHC), CO and $NO_x$. Note that the emission of NMHC is a value in gram obtained by converting a value represented in volumetric ratio based on equivalent carbon number. Note also that the measured value obtained by the 10 and 15-mode method was multiplied by 88/100, the measured value obtained by the 11-mode method was multiplied by 12/100, and the sum thereof was calculated. The results are summarized in the table below.

TABLE 1

| Catalyst | Emission per 1 km of travel distance (g/km) | | |
|---|---|---|---|
| | NMHC | CO | $NO_x$ |
| A | 0.013 | 0.539 | 0.005 |
| B | 0.016 | 0.571 | 0.005 |
| C | 0.019 | 0.579 | 0.006 |
| D | 0.019 | 0.592 | 0.010 |
| E | 0.010 | 0.528 | 0.008 |
| F | 0.016 | 0.542 | 0.005 |
| G | 0.020 | 0.579 | 0.008 |
| H | 0.021 | 0.584 | 0.008 |
| I | 0.011 | 0.542 | 0.006 |
| J | 0.032 | 0.720 | 0.034 |

As shown in the above table, in the case where the catalysts A to I were used, each emission of NMHC, CO and $NO_x$ was low as compared with the case where the catalyst J was used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst comprising:
a substrate;
a lower layer covering the substrate and including an oxygen storage material and palladium, the lower layer being rhodium-free; and
an upper layer covering the lower layer and including rhodium and a carrier supporting it, the upper layer being lower in oxygen storage capacity than the lower layer, wherein one of the lower and upper layers includes first and second layers each containing cerium and zirconium, and wherein the atomic ratio of cerium to zirconium in the first layer is greater than the atomic ratio of cerium to zirconium in the second layer.

2. The exhaust gas-purifying catalyst according to claim 1, wherein in the lower layer, a part on a side of the upper layer has a palladium content greater than that of a part on a side of the substrate.

3. The exhaust gas-purifying catalyst according to claim 2, wherein the part on the side of the substrate has a cerium content greater than that of the part on side of the upper layer.

4. The exhaust gas-purifying catalyst according to claim 3, wherein the part on the substrate side is palladium-free.

5. The exhaust gas-purifying catalyst according to claim 4, wherein the part on the side of the substrate further includes platinum.

6. The exhaust gas-purifying catalyst according to one of claims 1 to 5, wherein at least one of the lower layer and the upper layer further includes an alkaline-earth metal and/or a rare-earth element.

7. The exhaust gas-purifying catalyst according to claim 1, wherein the upper layer further includes palladium.

8. The exhaust gas-purifying catalyst according to claim 7, wherein in the upper layer, a part on a side of the lower layer has a greater rhodium content and a smaller palladium content as compared to a part on a side of its surface.

* * * * *